US012606219B2

(12) United States Patent
Prim

(10) Patent No.: US 12,606,219 B2
(45) Date of Patent: Apr. 21, 2026

(54) FRICTION TESTING SYSTEM, COMPUTER-IMPLEMENTED FRICTION-TESTING METHOD FOR A RAIL VEHICLE, COMPUTER PROGRAM AND NON-VOLATILE DATA CARRIER

(71) Applicant: DELLNER BUBENZER AB, Borlänge (SE)

(72) Inventor: Viktor Prim, Sandviken (SE)

(73) Assignee: DELLNER BUBENZER AB, Borlänge (SE)

( * ) Notice: Subject to any disclaimer, the term of this patent is extended or adjusted under 35 U.S.C. 154(b) by 5 days.

(21) Appl. No.: 18/862,626

(22) PCT Filed: Feb. 8, 2023

(86) PCT No.: PCT/EP2023/053123
§ 371 (c)(1),
(2) Date: Nov. 4, 2024

(87) PCT Pub. No.: WO2023/217421
PCT Pub. Date: Nov. 16, 2023

(65) Prior Publication Data
US 2025/0276723 A1     Sep. 4, 2025

(30) Foreign Application Priority Data
May 10, 2022    (EP) .................................... 22172518

(51) Int. Cl.
 *B61C 15/14*      (2006.01)
 *B60T 17/22*      (2006.01)
(52) U.S. Cl.
 CPC ............ *B61C 15/14* (2013.01); *B60T 17/228* (2013.01)

(58) Field of Classification Search
 CPC ............. B61L 15/0027; B61L 15/0081; B61L 15/0018; B61L 15/0072
 (Continued)

(56) References Cited

U.S. PATENT DOCUMENTS 9,956,970 B2 *   5/2018   Elstorpff ................... B60T 1/04
2005/0206230 A1   9/2005   Donnelly
(Continued)

FOREIGN PATENT DOCUMENTS

DE     102019204371 A1   10/2020
EP       0078655 A2    5/1983
(Continued)

*Primary Examiner* — Hai H Huynh
*Assistant Examiner* — Johnny H Hoang
(74) *Attorney, Agent, or Firm* — Dilworth & Barrese, LLP

(57) ABSTRACT

In a rail vehicle (100) a control unit (140) controls a set of brake/traction units (101, 161; 102, 162; 103, 163; 104, 164) by control signals (B1, A1; B2, A2; B3, A3; B4, A4) to apply a respective brake/traction force to a respective wheel axle (131, 132, 133, 134 to cause retardation/acceleration of the rail vehicle (100). The control unit (140) obtains a first wheel speed signal ($\omega_1$) indicating a rotational speed of at least one first wheel (121), and obtains a second wheel speed signal ($\omega_a$) indicating an average rotational speed of at least one second wheel (122, 123, 124). The control unit (140) produces a first control signal (BF; A1) to the first brake unit (101, 161) such that this unit applies a gradually increasing brake/traction force to the first wheel axle (131) until an absolute difference ($|\omega_1-\omega_a|$) between the first and second wheel speed signals ($\omega_1$; $\omega_a$) exceeds a threshold value. The control signals are produced such that an average brake/traction force applied to the at least one second wheel axle (132, 133, 134) is gradually decreased when the brake/traction force applied to the first wheel axle (131) is gradually increased. In response to the absolute difference ($|\omega_1-$
(Continued)

$\omega_a$|) exceeding the threshold value, the control unit (140) determines a parameter ($\mu_m$) reflecting a friction coefficient ($\mu_e$) between the wheels (121, 122, 123, 124) and a set of rails (181, 182) upon which the rail vehicle (100) travels.

16 Claims, 3 Drawing Sheets

(58) Field of Classification Search
USPC ........................................................ 701/123
See application file for complete search history.

(56) References Cited

U.S. PATENT DOCUMENTS

| | | | | |
|---|---|---|---|---|
| 2005/0246054 A1* | 11/2005 | Fink | ..................... | E05F 15/652 |
| | | | | 700/190 |
| 2012/0158223 A1* | 6/2012 | Liberatore | .............. | B61C 15/08 |
| | | | | 701/19 |
| 2013/0268172 A1* | 10/2013 | Nandedkar | .............. | G01P 3/50 |
| | | | | 701/1 |
| 2014/0246282 A1* | 9/2014 | Elstorpff | .............. | F16D 63/008 |
| | | | | 188/165 |

FOREIGN PATENT DOCUMENTS

| | | | |
|---|---|---|---|
| EP | 3483029 A1 | 5/2019 |
| EP | 2918459 B1 | 1/2021 |

* cited by examiner

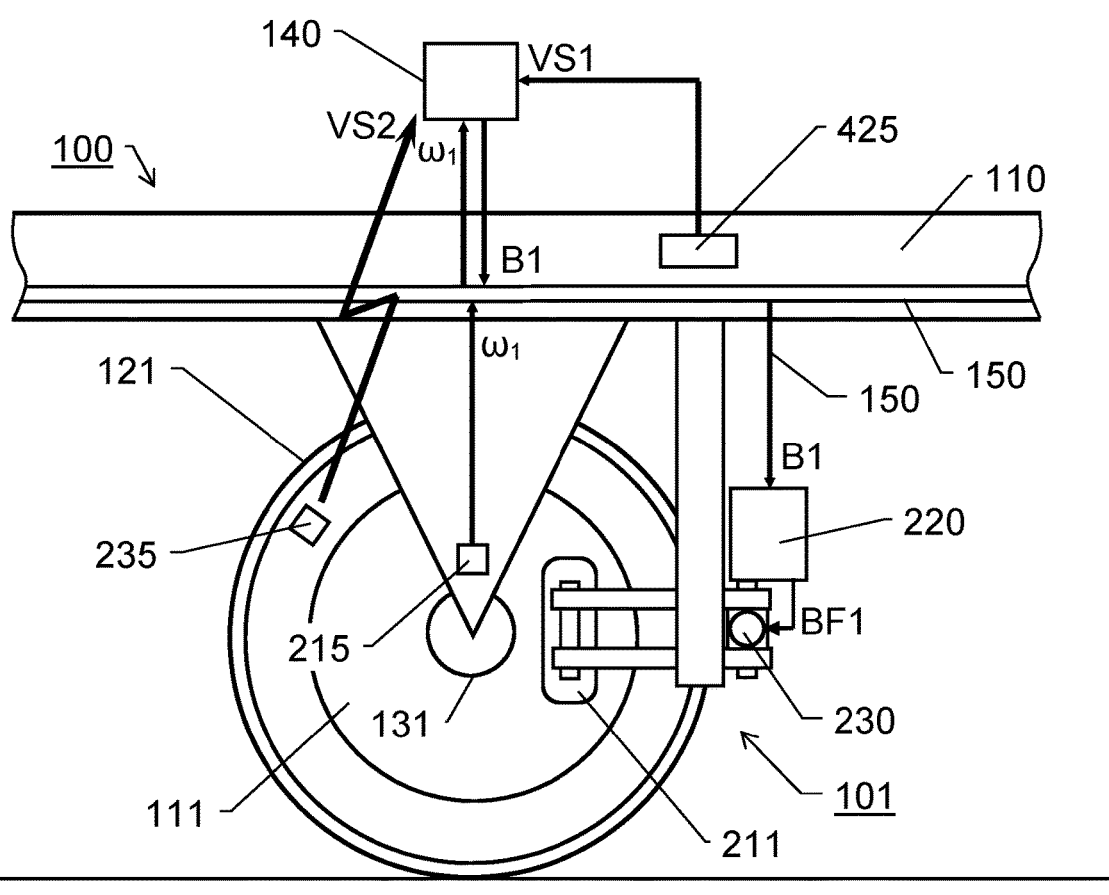
Fig. 2
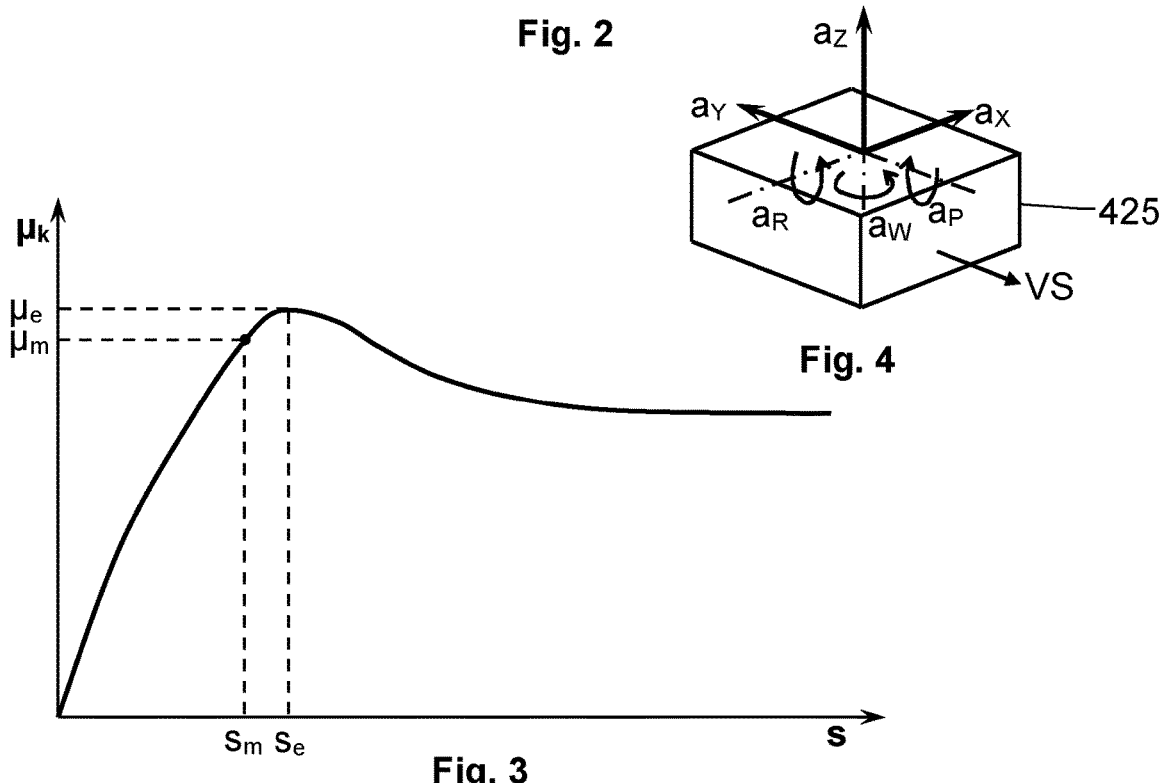
Fig. 4
Fig. 3

START

610
Friction to be tested?                No

Yes

620
Obtain 1st wheel speed
signal of 1st wheel

630
Obtain 2nd wheel speed signal
representing an average of at
least one 2nd wheel 640
Increase brake force/
traction on 1st wheel 650
Decrease brake force/traction
on the at least one 2nd wheel 660
Absolute difference
above threshold?                No Yes 670
Determine friction coefficient

FRICTION TESTING SYSTEM, COMPUTER-IMPLEMENTED FRICTION-TESTING METHOD FOR A RAIL VEHICLE, COMPUTER PROGRAM AND NON-VOLATILE DATA CARRIER

TECHNICAL FIELD

The present invention relates generally to safety arrangements for rail vehicle braking systems. Especially, the invention relates to a friction testing system for a rail vehicle according to the preamble of claim 1 and a corresponding computer-implemented method. The invention also relates to a computer program and a non-volatile data carrier storing such a computer program.

BACKGROUND

In operation of an electrically powered rail vehicle, the onboard motors are typically engaged as generators to decelerate the rail vehicle. However, for efficiency and safety reasons, one cannot rely solely on this braking strategy. In particular, a dedicated brake function will always be needed to ensure emergency braking functionality and that the rail vehicle remains stationary after that it has been brought to a stop. In many cases, the same brake units are used for different types of braking functionality, such as service braking, emergency braking and parking braking.

To accomplish efficient retardation of a rail vehicle it is crucial to have accurate knowledge about which braking distance can be expected. Today, the braking distance is tested relatively seldom, and the test results are normally reported in rather crude intervals with reference to an estimated potentially best value. One reason for this methodology is that estimating the braking distance requires that the rail vehicle applies a known brake force, which, due to mechanical wear and passenger comfort, cannot be executed very often. Consequently, a safety margin must always be applied to the estimated braking distance. This, in turn, results in that the safety distance between consecutive trains must be set to a longer value than what may actually be necessary. Thus, the full capacity of a given railway cannot be used.

EP 3 483 029 describes a system and method for testing adhesion conditions on a track. Here, at least one wheelset axle of a guided vehicle is accelerated up to or beyond an adhesion limit between a wheel of said wheelset and the rail supporting said wheel by applying a force on said wheelset, and determining, from a measure of a value of the force for which said wheel began to slip, an adhesion coefficient. The adhesion coefficient, in turn, can be communicated to other guided vehicles and/or to a central station enabling a map of adhesion coefficients for a railway network to be created and updated.

By applying the above strategy it may be possible to provide crude estimates of the adhesion coefficient at various parts of a railway network. However, since the preferred implementation of the strategy involves controlling independently one or several motors at the same time to independently accelerate the powered axle of different wheelsets according to different accelerations through application of tractive force to the powered axle of the different wheelsets there is a substantial risk that the rail vehicle shows a jerky behavior.

SUMMARY

The object of the present invention is to solve the above problems and offer a solution that enables frequent determining of highly reliable estimates of a friction coefficient between a rail vehicle's wheels and the rails upon which it travels while operating the rail vehicle in an overall smooth manner.

According to one aspect of the invention, the object is achieved by a friction testing system for a rail vehicle, which system contains a set of brake/traction units and a control unit. Each unit in the set of brake/traction units is configured to receive a respective control signal from the control unit, and in response thereto apply a respective brake/traction force to a respective wheel axle of the rail vehicle so as to cause retardation/acceleration of the rail vehicle. The control unit is configured to obtain a first wheel speed signal indicating a rotational speed of at least one first wheel on a first of said wheel axles to which a first brake/traction unit in the set of brake/traction units is configured to apply a brake/traction force. The control unit is further configured to obtain a second wheel speed signal indicating an average rotational speed of at least one second wheel on at least one second of said wheel axles to which at least one second brake/traction unit in the set of brake/traction units is configured to apply a respective brake/traction force. The control unit is further configured to produce a first control signal to the first brake/traction unit such that this unit applies a gradually increasing brake/traction force to the first wheel axle until an absolute difference between the first and second wheel speed signals exceeds a threshold value. In response to the absolute difference exceeding the threshold value, the control unit is configured to determine a parameter reflecting a friction coefficient between the wheels and a set of rails upon which the rail vehicle travels. Specifically, the control signals are produced such that an average brake/traction force applied to the at least one second wheel axle is gradually decreased when the brake/traction force applied to the first wheel axle is gradually increased.

The above friction testing system is advantageous because the proposed control of the brake/traction force smooths out the uneven distribution of brake/traction force and renders the friction-testing procedure barely noticeable to any the passengers on the rail vehicle. The passenger comfort is therefore essentially unaffected. Moreover, the friction testing system only causes insignificant mechanical wear on the equipment involved. As a result, the friction may be tested very frequently. A recurrently updated assessment of the friction, in turn, allows dynamic adaption of the safety distances between consecutive rail vehicles. As a result, the average throughput capacity in a given railroad network can be increased without sacrificing safety.

The proposed friction testing system is also flexible, since it allows assessment of the friction coefficient during braking as well as during acceleration of the rail vehicle.

According to one embodiment of this aspect of the invention, the control unit is further configured to produce the control signals such that, at each point in time, the gradual decrease of the average brake/traction force applied to the at least one second wheel axle corresponds to the gradual increase of the brake/traction force applied to the first wheel axle. Namely, this smooths out the uneven distribution of brake/traction force and renders the friction-testing procedure even less noticeable to the passengers on the rail vehicle.

According to another embodiment of this aspect of the invention, the friction testing system contains a set of rotational speed sensors configured to produce the first wheel speed signal and a respective wheel speed signal of the at least one second wheel on the at least one second wheel axle. For example, the rotational speed sensors may contain a respective tachometer arranged on or near the first wheel axle and/or on or near the at least one second wheel axle.

According to one embodiment of this aspect of the invention, at least one of the rotational speed sensors contains a first accelerometer arranged in a frame element of the rail vehicle, which first accelerometer is configured to produce at least one primary vector signal representing an acceleration of the a rail vehicle in at least one dimension, e.g. linearly along the rails. Moreover, at least one second accelerometer is eccentrically arranged relative to a rotation axis of at least one wheel of the rail vehicle. The at least one second accelerometer is configured to produce at least one secondary vector signal expressing movements of the at least one second accelerometer in a plane orthogonal to the rotation axis of the at least one wheel. Here, the control unit is configured to obtain the first wheel speed signal and/or at least one of the second wheel speed signals based on the primary and secondary vector signals. Such accelerometer-based measurement of the wheel speed signals is advantageous because it obviates the need for conventional sensors that typically are sensitive to dirt and mechanical influence.

According to yet another embodiment of this aspect of the invention, the set of brake/traction units specifically contains brake units, which each is configured to apply a respective brake force to the respective wheel axle in response to the respective control signal so as to cause retardation of the rail vehicle. Thus, the friction coefficient can be assessed during any type of service braking operation.

According to yet another embodiment of this aspect of the invention, the set of brake/traction units specifically contains traction motors, which each is configured to apply a respective traction force to the respective wheel axle in response to the respective control signal so as to cause acceleration of the rail vehicle. Thus, the friction coefficient can be assessed whenever the rail vehicle is driven.

According to a further embodiment of this aspect of the invention, the friction testing system includes a data bus configured to transmit the control signals from the control unit to each brake/traction unit in the set of brake/traction units. Thereby, the brake/traction unit may be controlled in an efficient and reliable manner.

According to another aspect of the invention, the object is achieved by a computer-implemented friction-testing method for a rail vehicle. The method involves producing respective control signals, which each is configured to be received by a respective brake/traction in a set of brake/traction units in the rail vehicle. In response to the control signal, the respective brake/traction unit in is configured to apply a respective brake/traction force to a respective wheel axle of the rail vehicle so as to cause retardation/acceleration of the rail vehicle. The method further involves obtaining a first wheel speed signal indicating a rotational speed of at least one first wheel on a first of said wheel axles to which a first brake/traction unit in the set of brake/traction units is configured to apply a brake/traction force. Additionally, the method involves obtaining a second wheel speed signal indicating an average rotational speed of at least one second wheel on at least one second of said wheel axles to which at least one second brake/traction unit in the set of brake/traction units is configured to apply a respective brake/traction force. The method also involves producing a first control signal to the first brake/traction unit such that this unit applies a gradually increasing brake/traction force to the first wheel axle until an absolute difference between the first and second wheel speed signals exceeds a threshold value. In response to the absolute difference exceeding the threshold value, the method involves determining a parameter reflecting a friction coefficient between the wheels and a set of rails upon which the rail vehicle travels. In particular, the control signals are produced such that an average brake/traction force applied to the at least one second wheel axle is gradually decreased when the brake/traction force applied to the first wheel axle is gradually increased. The advantages of this method, as well as the preferred embodiments thereof are apparent from the discussion above with reference to the proposed friction testing system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 2 shows a brake unit according to one embodiment of the invention;

FIG. 3 shows a graph illustrating an example of the friction coefficient as a function of wheel slippage;

FIG. 4 schematically illustrates an accelerometer according to one embodiment of the invention;

DETAILED DESCRIPTION

Figure 1:
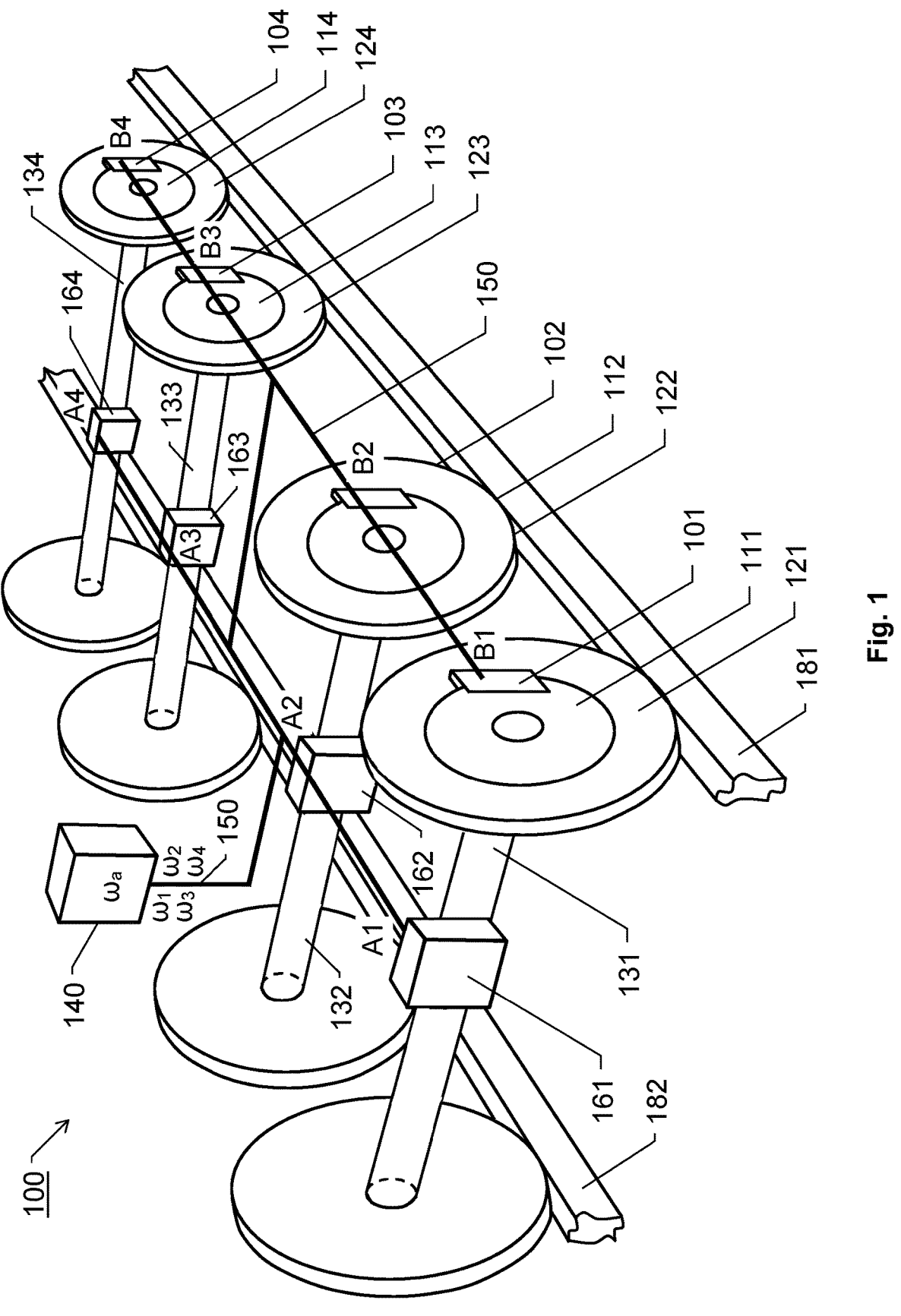
FIG. 1 schematically illustrates a rail vehicle equipped with a friction testing system according to one embodiment of the invention.

In FIG. 1, we see a schematic illustration of a rail vehicle 100 equipped with a friction testing system according to one embodiment of the invention.

The friction testing system contains a set of brake units 101, 102, 103 and 104 and/or a set of traction units 161, 162, 163 and 164, which each is configured to receive a respective control signal B1, B2, B3 and B4 respectively and/or A1, A2, A3 and A4 respectively. In response to control signals, brake/traction units are configured to apply a respective brake/traction force to a respective wheel axle 131, 132, 133 and 134 respectively of the rail vehicle 100 so as to cause retardation/acceleration of the rail vehicle 100.

The control unit 140 is configured to produce the respective control signals B1/A1, B2/A2, B3/A3 and/or B4/A4. In FIG. 1, the control unit 140 is illustrated as a separate unit. According to the invention, however, the control unit 140 may equally well be collocated with any other unit of the system. For instance, the control unit 140 may be integrated into any one of the of brake units 101, 102, 103 or 104 or the traction units 161, 162, 163 or 164.

The control unit 140 is also configured to obtain a first wheel speed signal $\omega_1$ indicating a rotational speed of at least one first wheel 121 on a first wheel axle 131 of the wheel axles to which first wheel axle 131 a first brake/ traction unit 101/161 in the set of brake/traction units is configured to apply a brake/traction force. Additionally, the control unit 140 is configured to obtain a second wheel speed signal $\omega_a$ indicating an average rotational speed of at least one second wheel 122, 123 and 124 on at least one second of said wheel axles 132, 133 and 134 respectively to which at least one second brake/traction unit in the set of brake/ traction units is configured to apply a respective brake/ traction force.

Moreover, the control unit 140 is configured to produce a first control signal BF or A1 to the first brake/traction unit 101 or 161 respectively such that this unit applies a gradually increasing brake/traction force to the first wheel axle 131. The gradually increase continues until an absolute difference $|\omega_1-\omega_a|$ between the first and second wheel speed signals $\omega_1$ and $\omega_a$ exceeds a threshold value. In response to the absolute difference $|\omega_1-\omega_a|$ exceeding the threshold value, the control unit 140 is configured to determine a parameter $\mu_m$ reflecting a friction coefficient $\mu_e$ between the wheels 121, 122, 123 and 124 and a set of rails 181 and 182 upon which the rail vehicle 100 travels.

It is worth noting that the above-mentioned first wheel axle 131 does not need to be a frontmost or a rearmost wheel axle of the rail vehicle 100. Actually, it is preferable that every wheel axle in the rail vehicle 100 represents the first wheel axle at different points in time. Namely, it is advantageous to execute the above procedure in line with a schedule, fixed or dynamic, wherein each wheel axle in the rail vehicle 100 alternately either represents the first wheel axle or is included in the set of at least one second wheel axle. Thus, the entire rail vehicle 100 becomes engaged in the friction testing, which is advantageous with respect to component wear. Such a strategy also facilitates identifying any anomalies in individual brake units and/or traction units.

FIG. 3 shows a graph illustrating an example of how the kinetic friction coefficient $\mu_k$ may be expressed as a function of the wheel slippage s, which here is understood to designate a common term for a sliding or spinning motion of the wheel relative to the rail. In other words, the wheel slippage s is applicable to retardation as well as acceleration.

Characteristically, the kinetic friction coefficient $\mu_k$ increases relatively proportionally with increasing wheel slippage s. When approaching a peak value $\mu_e$, however, the kinetic friction coefficient $\mu_k$ levels out somewhat. The friction coefficient peak value $\mu_e$ is associated with an optimal wheel slippage $s_e$ after which a further increase of wheel slippage s results in a gradually reduced kinetic friction coefficient $\mu_k$.

According to the invention, a parameter $\mu_m$ is determined that reflects the friction coefficient between the rail vehicle's 100 wheels the rails upon which the rail vehicle 100 travels. Ideally, the peak value $\mu_e$ should be derived. For example, the peak value $\mu_e$ may be derived as follows. When the absolute difference $|\omega_1-\omega_a|$ between the first and second wheel speed signals $\omega_1$ and $\omega_a$ exceeds the threshold value, this corresponds to a situation where the at least one wheel 121 on the first wheel axle 131 experiences a wheel slippage $s_m$ near the optimal wheel slippage $s_e$. The kinetic friction coefficient $\mu_k$ is given by the expression:

$$\mu_k = \frac{F}{m \cdot g}$$

where F is the force applied by the brake/traction unit, m is the mass of the rail vehicle 100, and g is the standard acceleration due to gravity.

Under the assumption that the wheel slippage $s_m$ is near the optimal wheel slippage $s_e$, the peak value $\mu_e$ of the kinetic friction coefficient $\mu_k$ may be estimated relatively accurately.

According to one embodiment of the invention, the control unit 140 is configured to produce the control signals B1/A1, B2/A2, B3/A3 or B4/A4 such that an average brake/traction force applied to the at least one second wheel axle 132, 133 and 134 is gradually decreased when the brake/traction force applied to the first wheel axle 131 is gradually increased. In other words, the at least one second wheel axle 132, 133 and 134 compensate for the excessive force applied to the first wheel axle 131.

Preferably, this compensation is temporally matched. This means that the control unit 140 is configured to produce the control signals B1/A1, B2/A2, B3/A3 and B4/A4 such that, at each point in time, the gradual decrease of the average brake/traction force applied to the at least one second wheel axle 132, 133 and 134 corresponds to the gradual increase of the brake/traction force applied to the first wheel axle 131. Namely, thereby the deviating brake/traction force applied to first wheel axle 131 is masked by the opposite deviation represented by the brake/traction force applied to the least one second wheel axle 132, 133 and 134.

FIG. 2 shows a brake unit 101 according to one embodiment of the invention. The brake unit 101 is configured to receive the control signals, e.g. representing a brake command B1 from the control unit 140, for example via a data bus 150. In response thereto, the brake unit 101 is configured to execute a brake action. The brake unit 101 may contain a rotatable member 111, first and second pressing members, here symbolized by 211, a brake actuator 220, a gear assembly (not shown) and an electric motor 230. The rotatable member 111, which may be represented by a brake disc or a brake drum is mechanically linked to at least one wheel 121 of the rail vehicle 100. Specifically, in response to the brake command B1, the brake actuator 220 is preferably configured to produce a brake force signal BF1 to the electric motor 230, which, in turn, causes the electric motor 230 to cause the first and second pressing members 211 to move relative to the rotatable member 111.

It should be pointed out that, according to the invention, the electric motor 230 may be replaced by a pneumatically operated piston-and-cylinder arrangement configured to actuate the first and second pressing members.

Further, for the overall efficiency, the data bus 150 may, of course, be configured to transmit the all the control signals B1, A1; B2, A2; B3, A3; B4 and/or A4 from the control unit 140 to each brake/traction unit in the set of brake/traction units 101, 161; 102, 162; 103, 163, 104 and/or 164.

Each of the first and second pressing members 211 is configured to move relative to the rotatable member 111 to execute the brake action. Typically, the brake action involves applying a particular brake force on the rotatable member 111. However, the brake action may also involve reducing or releasing an already applied brake force.

Referring again to FIG. 1, we will now describe one embodiment of the invention, wherein the friction is tested during acceleration of the rail vehicle 100 by employing the traction units 161, 162, 163 and 164 respectively.

Here, the control unit 140 is configured to obtain a first wheel speed signal $\omega_1$ indicating a rotational speed of at least one first wheel 121 on a first wheel axle of the wheel axles to which first wheel axle a first traction unit 161 in the set of traction units is configured to apply a traction force.

Additionally, the control unit 140 is configured to obtain a second wheel speed signal $\omega_a$ indicating an average rotational speed of at least one second wheel, say 122, 123 and 124, on at least one second wheel axle 132, 133 and 134 respectively of said wheel axles to which at least one second wheel axle 132, 133 and 134 at least one second traction unit 162, 163 and 164 respectively in the set of traction units is configured to apply a respective traction force.

Further, the control unit 140 is configured to produce a first control signal A1 to the first traction unit 161 such that this unit applies a gradually increasing traction force to the first wheel axle 131 until an absolute difference $|\omega_1-\omega_a|$ between the first and second wheel speed signals $\omega_1$ and $\omega_a$ exceeds a threshold value. In response to the absolute difference $|\omega_1-\omega_a|$ exceeding the threshold value, as described above, the control unit 140 is configured to determine the parameter $\mu_m$ reflecting the friction coefficient $\mu_e$ between the wheels 121, 122, 123 and 124 and a set of rails 181 and 182 respectively upon which the rail vehicle 100 travels.

According to embodiments of the invention, different combinations of the brake units 101, 102, 103, 104 and the traction units 161, 162, 163, 164 may be employed to test the friction. For example, while the rail vehicle 100 travels at constant speed, i.e. it neither accelerates nor decelerates, the control unit 140 may be configured to produce a first control signal A1 to the first traction unit 161 such that this unit applies a gradually increases the traction force applied to the first wheel axle 131. In parallel, the control unit 140 is here configured to produce at least one second control signal B2, B3 and B4 such that these units apply gradually increasing brake forces to the at least one second wheel axle 132, 133 and 134 respectively. The control unit 140 is configured to continue to produce the first control signal A1 and the at least one second control signals B2, B3 and B4 until an absolute difference $|\omega_1-\omega_a|$ between the first and second wheel speed signals $\omega_1$ and $\omega_a$ exceeds the threshold value. In response to the absolute difference $|\omega_1-\omega_a|$ exceeding the threshold value, the control unit 140 is configured to determine the parameter $\mu_m$ reflecting the friction coefficient $\mu_e$ between the wheels 121, 122, 123 and 124 and a set of rails 181 and 182 respectively upon which the rail vehicle 100 travels. This determining is possible based on knowledge about the respective traction and brake forces applied to the wheel axles when the absolute difference $|\omega_1-\omega_a|$ exceeds the threshold value.

Naturally, the opposite approach is likewise possible, i.e. that the control unit 140 instead produces the first control signal B1 to the first brake unit 101 such that this unit applies a gradually increasing brake force to the first wheel axle 131, and in parallel, the control unit 140 produces the at least one second control signal A2, A3 and A4 to the at least one second traction unit 162, 163 and 164 respectively such that these units apply gradually increasing traction forces to the at least one second wheel axle 132, 133 and 134.

According to one embodiment of the invention, the friction testing system contains a set of rotational speed sensors 215, 235 and 425 configured to produce the first wheel speed signal $\omega_1$ and a respective wheel speed signal $\omega_2$, $\omega_3$ and $\omega_4$ of the at least one second wheel 122, 123 and 124 on the at least one second wheel axle 132, 133 and 134 respectively. For instance, the rotational speed sensor may include a tachometer 215 that is arranged on or near the first wheel axle 131 and/or on or near the at least one second wheel axle 132, 133 and/or 134 respectively.

FIG. 4 schematically illustrates an accelerometer 425 according to one embodiment of the invention.

According to one embodiment of the invention the friction testing system contains a first accelerometer 425 and at least one second accelerometer 235.

The first accelerometer 425 is arranged in a frame element 110 of the rail vehicle 100. The first accelerometer 425 is configured to produce at least one primary vector signal VS1 representing an acceleration, of the a rail vehicle 100 in at least one dimension, typically in each of the three spatial directions $a_X$, $a_Y$ and $a_Z$ and respective rotations $a_R$, $a_P$ and $a_W$ around axes along each of these directions.

Each of the at least one second accelerometer 235 is eccentrically arranged relative to a rotation axis of at least one wheel, say 121 as illustrated in FIG. 2 of the rail vehicle 100. The at least one second accelerometer 235 is configured to produce at least one secondary vector signal VS2 expressing movements of the at least one second accelerometer 235 in a plane orthogonal to the rotation axis of the at least one wheel 121.

Furthermore, the control unit 140 is configured to obtain the first wheel speed signal $\omega_1$ and/or at least one of the second wheel speed signals $\omega_2$, $\omega_3$ and/or $\omega_4$ based on the primary and secondary vector signals VS1 and VS2 respectively using mechanic calculations.

It is generally advantageous if the above-described braking procedure is effected in an automatic manner by executing one or more computer programs. Therefore, the brake actuator 120 preferably includes processing circuitry and programmed memory units, the design of which will be briefly described below with reference to FIG. 5.

Figures 5, 6:
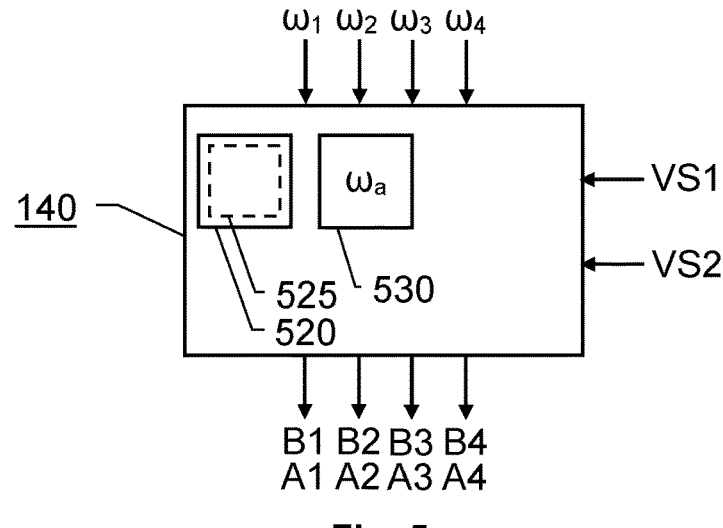
FIG. 5 shows a block diagram of a control unit according to one embodiment of the invention.
FIG. 6 illustrates, by means of a flow diagram, the general method according to the invention.

FIG. 5 shows a block diagram of the control unit 140 according to one embodiment of the invention. The control unit 140 includes processing circuitry in the form of at least one processor 530 and a memory unit 520, i.e. non-volatile data carrier, storing a computer program 525, which, in turn, contains software for making the at least one processor 530 execute the actions mentioned in this disclosure when the computer program 525 is run on the at least one processor 530.

The control unit 140 contains inputs configured to receive the wheel speed signals $\omega_1$, $\omega_2$, $\omega_3$, and $\omega_4$. Alternatively, or additionally, the control unit 140 may also contain inputs configured to receive the primary and secondary vector signals VS1 and VS2 respectively. Further, the control unit 140 contains outputs configured to provide the control signals B1, B2, B3 and B4 and/or A1, A2, A3 and A4. According to embodiments of the invention one or more of the above input and/or output signals may be communicated via the data bus 150.

In order to sum up, and with reference to the flow diagram in FIG. 6, we will now describe the computer-implemented friction-testing method for a rail vehicle that is carried out by the control unit 140.

In a first step 610, it is checked whether the friction is to be tested, for example in response to the expiry of a timer function, or in response to an operator command. If, in step 610 it is found that the friction shall be tested, steps 620 and 630 follow, which may or may not be executed in parallel. If, in step 610 it is found that the friction shall not be tested, the procedure loops back and stays in step 610.

In step 620, the control unit 140 obtains a first wheel speed signal $\omega_1$ indicating a rotational speed of at least one first wheel 121 on a first of said wheel axles 131 to which a first brake/traction unit 101/161 in the set of brake/traction units is configured to apply a brake/traction force.

In step 630 the control unit 140 obtains a second wheel speed signal $\omega_a$ indicating an average rotational speed of at least one second wheel 122, 123 and/or 124 on at least one second of said wheel axles 132, 133 and/or 134 respectively to which at least one second brake/traction unit in the set of brake/traction units is configured to apply a respective brake/traction force.

In a step 640 subsequent to step 620, the control unit 140 produces a first control signal to the first brake/traction unit 101 or 161 respectively such that this unit applies a gradually increasing brake/traction force to the first wheel axle 131.

In a step 650 subsequent to step 630, the control unit 140 produces at least one second control signal to the at least one second brake/traction unit 102, 103 and 104 or 162, 163 and 164 respectively such that these units apply gradually decreasing brake/traction forces to the at least one second wheel axle 132, 133 and 134 respectively. Thus, the uneven distribution of brake/traction force is smoothed out and the friction-testing procedure is rendered barely noticeable to any the passengers on the rail vehicle, which, of course, enhances the passenger comfort.

A step 660 follows after the steps 640 and 650, which step 660 checks if an absolute difference $|\omega_1-\omega_a|$ between the first and second wheel speed signals $\omega_1$ and $\omega_a$ exceeds a threshold value. If so, a step 670 follows; and otherwise, the procedure loops back to steps 620 and 640.

In step 670, a parameter $\mu_m$ is determined, which reflects a friction coefficient $\mu_e$ between the wheels 121, 122, 123 and 124 and the set of rails 181 and 182 upon which the rail vehicle 100 travels. Thereafter, the procedure loops back to step 610.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

Variations to the disclosed embodiments can be understood and effected by those skilled in the art in practicing the claimed invention, from a study of the drawings, the disclosure, and the appended claims.

The invention is not restricted to the described embodiments in the figures, but may be varied freely within the scope of the claims.

The invention claimed is:

1. A friction testing system for a rail vehicle (100), which system comprises:

a set of brake/traction units (101, 161; 102, 162; 103, 163; 104, 164), which each is configured to receive a respective control signal (B1, A1; B2, A2; B3, A3; B4, A4) and in response thereto apply a respective brake/traction force to a respective wheel axle (131, 132, 133, 134) of the rail vehicle (100) to cause retardation/acceleration of the rail vehicle (100), and a control unit (140) configured to produce the respective control signals (B1, A1; B2, A2; B3, A3; B4, A4), wherein the control unit (140) is configured to:

obtain a first wheel speed signal ($\omega 1$) indicating a rotational speed of at least one first wheel (121) on a first of said wheel axles (131) to which a first brake/traction unit (101, 161) in the set of brake/traction units is configured to apply a brake/traction force;

obtain a second wheel speed signal (wa) indicating an average rotational speed of at least one second wheel (122, 123, 124) on at least one second of said wheel axles (132, 133, 134) to which at least one second brake/traction unit in the set of brake/traction units is configured to apply a respective brake/traction force;

produce a first control signal (BF; A1) to the first brake/traction unit (101, 161) such that this unit applies a gradually increasing brake/traction force to the first wheel axle (131) until an absolute difference ($|\omega 1-\omega a|$) between the first and second wheel speed signals ($\omega 1$; $\omega a$) exceeds a threshold value; and in response to the absolute difference ($|\omega 1-\omega a|$) exceeding the threshold value;

determine a parameter ($\mu m$) reflecting a friction coefficient (ue) between the wheels (121, 122, 123, 124) and a set of rails (181, 182) upon which the rail vehicle (100) travels; and produce the control signals (B1, A1; B2, A2; B3, A3; B4, A4) such that an average brake/traction force applied to the at least one second wheel axle (132, 133, 134) is gradually decreased when the brake/traction force applied to the first wheel axle (131) is gradually increased.

2. The friction testing system according to claim 1, wherein the control unit (140) is configured to produce the control signals (B1, A1; B2, A2; B3, A3; B4, A4) such that, at each point in time, the gradual decrease of the average brake/traction force applied to the at least one second wheel axle (132, 133, 134) corresponds to the gradual increase of the brake/traction force applied to the first wheel axle (131).

3. The friction testing system according to claim 1, comprising a set of rotational speed sensors (215; 235, 425) configured to produce the first wheel speed signal ($\omega$1) and a respective wheel speed signal ($\omega$2, $\omega$3, $\omega$4) of the at least one second wheel (122, 123, 124) on the at least one second wheel axle (132, 133, 134).

4. The friction testing system according to claim 3, wherein at least one rotational speed sensor in the set of rotational speed sensors comprises a tachometer (215) arranged on or near the first wheel axle (131) and/or on or near the at least one second wheel axle (132, 133, 134).

5. The friction testing system according to claim 3, comprising:
   a first accelerometer (425) arranged in a frame element (110) of the rail vehicle (100), which first accelerometer (425) is configured to produce at least one primary vector signal (VS1) representing an acceleration (aX, aY, aZ, aR, aP, aW) of the a rail vehicle (100) in at least one dimension, and
   at least one second accelerometer (235) eccentrically arranged relative to a rotation axis of at least one wheel (121) of the rail vehicle (100), which at least one second accelerometer (235) is configured to produce at least one secondary vector signal (VS2) expressing movements of the at least one second accelerometer (235) in a plane orthogonal to the rotation axis of the at least one wheel (121), and
   wherein the control unit (140) is configured to obtain the first wheel speed signal ($\omega$1) and/or at least one of the second wheel speed signals ($\omega$2, $\omega$3, $\omega$4) based on the primary and secondary vector signals (VS1; VS2).

6. The friction testing system according to claim 1, wherein
   the set of brake/traction units comprises brake units (101, 102, 103, 104), which each is configured to apply a respective brake force to the respective wheel axle (131, 132, 133, 134) in response to the respective control signal (B1, B2, B3, B4) to cause retardation of the rail vehicle (100).

7. The friction testing system according to claim 1, wherein
   the set of brake/traction units comprises traction motors (161, 162, 163, 164), which each is configured to apply a respective traction force to the respective wheel axle (131, 132, 133, 134) in response to the respective control signal (A1, A2, A3, A4) to cause acceleration of the rail vehicle (100).

8. The friction testing system according to claim 1, comprising a data bus (150) configured to transmit the control signals (B1, A1; B2, A2; B3, A3; B4, A4) from the control unit (140) to each brake/traction unit in the set of brake/traction units (101, 161; 102, 162; 103, 163; 104, 164).

9. A computer-implemented friction-testing method for a rail vehicle (100), comprising:
   producing respective control signals (B1, A1; B2, A2; B3, A3; B4, A4) which each is configured to be received by a respective brake/traction in a set of brake/traction units (101, 161; 102, 162; 103, 163; 104, 164) in the rail vehicle (100), which respective brake/traction unit in response to the control signal is configured to apply a respective brake/traction force to a respective wheel axle (131, 132, 133, 134) of the rail vehicle (100) to cause retardation/acceleration of the rail vehicle (100);
   obtaining a first wheel speed signal ($\omega$1) indicating a rotational speed of at least one first wheel (121) on a first of said wheel axles (131) to which a first brake/traction unit (101, 161) in the set of brake/traction units is configured to apply a brake/traction force;
   obtaining a second wheel speed signal ($\omega$a) indicating an average rotational speed of at least one second wheel (122, 123, 124) on at least one second of said wheel axles (132, 133, 134) to which at least one second brake/traction unit in the set of brake/traction units is configured to apply a respective brake/traction force;
   producing a first control signal (BF; A1) to the first brake/traction unit (101, 161) such that this unit applies a gradually increasing brake/traction force to the first wheel axle (131) until an absolute difference (@1−$\omega$a|) between the first and second wheel speed signals ($\omega$1; $\omega$a) exceeds a threshold value; and in response to the absolute difference (|$\omega$1−$\omega$a) exceeding the threshold value;
   determining a parameter ($\mu$m) reflecting a friction coefficient ($\mu$e) between the wheels (121, 122, 123, 124) and a set of rails (181, 182) upon which the rail vehicle (100) travels; and
   producing the control signals (B1, A1; B2, A2; B3, A3; B4, A4) such that an average brake/traction force applied to the at least one second wheel axle (132, 133, 134) is gradually decreased when the brake/traction force applied to the first wheel axle (131) is gradually increased.

10. The method according to claim 9, comprising producing the control signals (B1, A1; B2, A2; B3, A3; B4, A4) such that, at each point in time, the gradual decrease of the average brake/traction force applied to the at least one second wheel axle (132, 133, 134) corresponds to the gradual increase of the brake/traction force applied to the first wheel axle (131).

11. The method according to claim 9, comprising obtaining the first wheel speed signal ($\omega$1) and a respective wheel speed signal ($\omega$2, $\omega$3, $\omega$4) of the at least one second wheel (122, 123, 124) on the at least one second wheel axle (132, 133, 134) from a set of rotational speed sensors (215; 235, 425) in the rail vehicle (100).

12. The method according to claim 11, wherein at least one rotational speed sensor in the set of rotational speed sensors comprises a tachometer (215) arranged on or near the first wheel axle (131) and/or on or near the at least one second wheel axle (132, 133, 134).

13. The method according to claim 11, wherein the rail vehicle (100) comprises: a first accelerometer (425) arranged in a frame element (110) of the rail vehicle (100), which first accelerometer (425) is configured to produce at least one primary vector signal (VS1) representing an acceleration (aX, aY, aZ, aR, aP, aW) of the rail vehicle (100) in at least one dimension, and at least one second accelerometer (235) eccentrically arranged relative to a rotation axis of at least one wheel (121) of the rail vehicle (100), which at least one second accelerometer (235) is configured to produce at least one secondary vector signal (VS2) expressing movements of the at least one second accelerometer (235) in a plane orthogonal to the rotation axis of the at least one wheel (121), and the method comprises:
   obtaining the first wheel speed signal ($\omega$1) and/or at least one of the second wheel speed signals ($\omega$2, $\omega$3, $\omega$4) based on the primary and secondary vector signals (VS1; VS2).

14. The method according to claim 9, wherein the rail vehicle (100) comprises a data bus (150) and the method comprises:

transmitting the control signals (B1, A1; B2, A2; B3, A3; B4, A4) to each brake/traction unit in the set of brake/ traction units (101, 161; 102, 162; 103, 163; 104, 164) over the data bus (150).

15. A computer program (525) loadable into a non-volatile data carrier (520) communicatively connected to at least one processor (530), the computer program (525) comprising software for executing the method according to claim 9 when the computer program (525) is run on the at least one processor (530).

16. A non-volatile data carrier (520) containing the computer program (425) of claim 15.

\*   \*   \*   \*   \*